United States Patent [19]

Murakami et al.

[11] Patent Number: 4,486,546

[45] Date of Patent: Dec. 4, 1984

[54] PROCESS FOR PREPARING A HEAT RESISTANT SOFT COMPOSITE

[75] Inventors: Tadaki Murakami, Hyogo; Yasuhiko Ikeda, Sanda; Isao Ishii, Amagasaki, all of Japan

[73] Assignee: Mitsubishi Denki Kabushiki Kaisha, Tokyo, Japan

[21] Appl. No.: 533,793

[22] Filed: Sep. 19, 1983

[30] Foreign Application Priority Data

Sep. 30, 1982 [JP] Japan ................................. 57-173562

[51] Int. Cl.$^3$ ............................................. C04B 35/16
[52] U.S. Cl. .................................... 501/153; 501/154; 106/DIG. 3
[58] Field of Search ............................... 501/153, 154; 106/DIG. 3

[56] References Cited

U.S. PATENT DOCUMENTS 4,412,010  10/1983  Ishii et al. .................... 106/DIG. 3
4,436,831   3/1984  Nishizako et al. ............ 106/DIG. 3

*Primary Examiner*—James Poer
*Attorney, Agent, or Firm*—Oblon, Fisher, Spivak, McClelland & Maier

[57] ABSTRACT

A process for preparing a heat resistant soft composite which comprises hot-pressing a mixture comprising talc powder and mica powder as major components and a bonding material composed of normal boric acid, boric acid anhydride and zinc oxide, at a temperature of from 160° to 200° C. under pressure of from 50 to 100 kg/cm$^2$ to form a composite, and subjecting the composite to heat treatment at a temperature of from 450° to 500° C.

3 Claims, No Drawings

PROCESS FOR PREPARING A HEAT RESISTANT SOFT COMPOSITE

The present invention relates to a process for preparing a heat resistant soft composite useful as a supporting member of a heat treatment jig which is wear-resistant and capable of holding an article such as a glass article without imparting damages or stains when such an article is subjected to continuous or repeated heat treatment in an atmosphere at a temperature of about 500° C.

Heretofore, inorganic materials having heat resistance at a high temperature have been studied for the material to meet such requirements. It has been known to use an asbestos tape, an asbestos cement, an asbestos calcium silicate or boron nitride as a material for supporting members of heat treatment jigs for glass articles.

The asbestos tape is usually used in such a manner that it is wound on a metal core for reinforcement. However, the winding operation is rather cumbersome.

The asbestos cement is prepared by binding asbestos with e.g. Portland cement, and has a great hardness, whereby it is likely to give damages or scars to the glass articles.

The asbestos calcium silicate is a highly porous soft material and does not give damages to the glass articles. However, it is susceptible to wearing, and a cumbersome operation will be required for its replacement.

Further, each of the above-mentioned materials contains asbestos which is regarded as a poisonous chemical substance, and a due care must be taken in its handling.

Boron nitride is easy to handle and superior in the wear resistance to the above-mentioned asbestos materials. However, it is extremely expensive.

It is therefore an object of the present invention to overcome the drawbacks of the conventional materials for supporting members of the heat treatment jigs and to provide a process for preparing a heat resistant soft composite which is useful as an inexpensive supporting member for the heat treatment jig which does not give scars to the glass articles and has superior wear-resistance.

Namely, the present invention provides a process for preparing heat resistant soft composite which comprises hot-pressing a mixture comprising talc powder and mica powder as major components and a bonding material composed of normal boric acid, boric acid anhydride and zinc oxide, at a temperature of from 160° to 200° C. under pressure of from 50 to 100 kg/cm$^2$ to form a composite, and subjecting the composite to heat treatment at a temperature of from 450° to 500° C.

Now, the present invention will be described in detail with reference to the preferred embodiments.

The bonding material to be used in the present invention is known, for instance, by Japanese Examined patent publications No. 7359/1979 and No. 7360/1979, in which the process for its preparation is also disclosed. When subjected to hot-pressing, this bonding material undergoes a kind of hydration reaction to form a hydrated zinc borate salt composed mainly of $2ZnO.3B_2O_3.3H_2O$, which is, when further subjected to heat treatment at a temperature of from 350° to 450° C., thermally converted into $\beta\text{-}ZnO.B_2O_3$, whereby the water resistance and heat resistance are improved.

In the present invention, the binding material of this type is used to bind the major components. It is a feature of the present invention to use talc powder and mica powder as the major components.

Namely, when a glass article is heat-treated at a temperature of about 500° C., the viscosity of the glass decreases, and if the supporting members of the heat treatment jig which are incontact with the glass article, is hard, it is likely that scars or cracks are imparted to the glass article.

Accordingly, the supporting members of the heat treatment jig is required to be a heat resistant soft composite which has adequate heat resistance at a temperature of at least 500° C. and superior wear-resistance and which does not impart scars or cracks to the glass article.

The bonding material to be used in the present invention was known to have adequatge heat resistance at a temperature of at least 500° C. For the major components, however, materials are rather limited as they are required to be a soft material and yet have adequate heat resistance.

From an extensive research on the major components, it has been found that when talc powder and mica powder having small hardness are used within the following ranges, it is possible to obtain a desired heat resistant soft composite.

Major Components
25–45% by weight of talc powder
15–40% by weight of mica powder

Bonding Material
16.30–18.63% by weight of normal boric acid
3.68–4.20% by weight of boric acid anhydride
15.62–17.17% by weight of zinc oxide The talc powder is represented by the formula of $3MgO.4SiO_2.H_2O$ and has superior heat resistance with the decomposition temperature of the crystal water being as high as 850° C. It is a soft material with a Mohs' hardness being as small as 1.

As the mica powder, muscovite powder $[KAl_2(AlSi_3O_{10})(OH)_2]$ and phlogopite powder $[KMg_3(AlSi_3O_{10})(OH)_2]$ are suitable, and they have superior heat resistance each with a decomposition temperature of the crystal water being from 700° to 900° C. Their Mohs' hardness is from 2 to 3, and thus they are soft materials next to the talc powder.

The talc powder is used to maintain the softness of the heat resistant soft composite of the present invention, whereas the mica powder is used to maintain the strength.

The bonding material serves to bond these major components to form a composite. Now, the ranges of the proportions of these materials will be described.

The content of the talc powder to constitute the heat resistant soft composite is preferably from 25 to 45% by weight. If the content is less than 25% by weight, the Mohs' hardness of the heat resistant soft composite tends to exceed 3, whereby there will be a possibility of imparting scars to the glass article. On the other hand, if the content exceeds 45% by weight, the contents of mica and the bonding material are obliged to be small, whereby the heat resistant soft composite tends to have poor strength and will no longer be useful as the supporting members for the heat treating jig.

The mica powder is preferably used in an amount within a range of from 15 to 45% by weight. If the amount is less than 15% by weight, the strength of the heat resistant soft composite tends to be poor, and if the amount exceeds 40% by weight, the contents of the talc powder and the bonding material are obliged to be small, whereby the hardness tends to be too great and at the same time the strength tends to decrease, and the composite will no longer be useful as the supporting members of the heat treatment jig.

The content of the bonding material to be used in the present invention is preferably from 35 to 40% by weight. The bonding material preferably comprises from 16.30 to 18.63% by weight of normal boric acid, from 3.69 to 4.20% by weight of boric acid anhydride and from 15.02 to 17.17% by weight of zinc oxide. If the content of the normal boric acid is less than 16.30% by weight, no adequate bonding effect is obtainable and if the content exceeds 18.63% by weight, the melt of normal boric acid tends to flow out of the mold during the hot-pressing operation and it is difficult to obtain a composite having a uniform density. If the boric acid anhydride is less than 3.68% by weight, it will be necessary to discharge water generated by the thermal decomposition of normal boric acid during the hot-pressing operation, including a degasification operation, whereby the hot-pressing operation tends to be cumbersome. If the amount exceeds 18.63% by weight, the boric acid anhydride tends to remain in the composite, whereby the water resistance tends to be poor and the hardness tends to increase to an undesirable extent. If the zinc oxide is less than 15.02% by weight, it will be difficult to adequately form reaction products such as $2ZnO.3B_2O_3.3H_2O$ and $\beta ZnO.B_2O_3$, and the thermal decomposition products of normal boric acid and boric acid anhydride tends to remain in the composite, whereby the water resistance tends to be poor and the hardness tends to increase. If the amount of the zinc oxide exceeds 17.17% by weight, the reaction products will be adequatelty formed, but the contents of the other materials constituting the bonding material are obliged to be small, whereby no adequate bonding effect is expected.

Accordingly, in the present invention, the bonding material should preferably be used in an amount of from 35 to 40% by weight, and the materials constituting the bonding material are preferably used within the above-mentioned ranges.

The heat resistant soft composite prepared by subjecting the mixture of the materials within the above-mentioned ranges to hot-pressing and heat treatment under the after-mentioned process conditions, is composed of from 26.9 to 49.0% by weight of the talc component, from 16.3 to 43.1% by weight of the mica component, from 13.9 to 16.0% by weight of the $B_2O_3$ component and from 16.2 to 18.7% by weight of the ZnO component. These weight percentages represent the proportions of the respective components based on the total amounts of the materials where the water contained in the normal boric acid of the bonding material has been removed. The upper and lower limits of each range were taken from the maximum and minimum weight percentages obtained by the Examples as shown in Table 1 given hereinafter.

Now, with respect to the hot-pressing method for forming the composite, the heating temperature is preferably within a range of from 160° to 200° C. If the temperature is lower than 160° C., the bonding material is incapable of providing adequate effectiveness (for instance, the bonding strength will be inferior and no adequate reaction between the materials constituting the bonding material will take place.). Even when the temperature exceeds 200° C., a desired composite can be obtained. However, in such a case, the production costs will be high, and the operability tends to be inferior as the temperature increases. For these reasons, the heating temperature should preferably be within the above-mentioned range.

The pressure is preferably within a range of from 50 to 100 kg/cm². If the pressure is less than 50 kg/cm², it is difficult to obtain a composite having a uniform density, and no adequate reaction between the materials constituting the bonding material will take place. Even when the pressure is higher than 100 kg/cm², a desired composite can be obtained. However, in such a case, a complex installation will be required, and no additional effectiveness will be obtained by increasing the pressure. For these reasons, the pressure is selected preferably within the above-mentioned range.

Then, the composite is subjected to heat treatment to obtain a heat resistant soft composite of the present invention. The heat treatment is preferably conducted at a temperature of from 450° to 500° C.

The heat resistant soft composite of the present invention is required to have heat resistance at a temperature of at least 500° C. When the reaction product of the bonding material is converted from $2ZnO.3B_2O_3.3H_2O$ to $\beta$-$ZnO.B_2O_3$ by removing the crystal water, a composite having superior heat resistance is obtainable. For this purpose, the heat treatment is conducted at a temperature higher than from 350° to 450° C., i.e. a temperature at which $2ZnO.3B_2O_3.3H_2O$ is converted to $\beta$-$ZnO.B_2O_3$. The product obtained by the heat treatment at a temperature of from 450° to 500° C., does not undergo any deformation or any deterioration in the strength even when exposed to an atmosphere of 700° C., and it is non-flammable and has superior heat resistance.

The heat resistant soft composite obtained by the present invention may be press-molded into various shapes suitable for use as supporting members of heat treatment jigs for glass articles, whereby it is possible to obtain products having good properties as the supporting members which are free from the above-mentioned drawbacks of the conventional products.

Further, the heat resistant soft composite obtained by the present invention has an additional feature that it has a superior electric insulating property, and it can be used as a heat resistant non-flammable electric insulator.

Now, the present invention will be described in further detail with reference to typical Examples.

EXAMPLE 1

The talc powder ($3MgO.4SiO_2.H_2O$; manufactured by Matsumura Sangyo K.K.) used as a major component was white powder having a particle size of from 40 to 80 μm.

The mica powder [$KAl_2(AlSi_3O_{10})(OH)_2$; manufactured by Okabe Mica K.K.] was muscovite powder having a particle size of from 50 to 300 μm.

Normal boric acid ($H_3BO_3$; manufactured by 20 Tow Bashajirushi Borax) as a bonding material was used in a pulverized form having a particle size of at most 74 μm. Boric acid anhydride ($B_2O_3$; manufactured by 20 Tow Bashajirushi Borax) was used in a powder form having a particle size of at most 200 μm.

Zinc oxide (ZnO; manufactured by Sakai Kagaku K.K) was used in a powder form having a particle size of at most 10 μm.

The above materials were combined to have the following proportions and mixed by a pulverizer, a ball mill or a mixer to obtain composite material of the present invention.

Major Components

Talc powder: 45% by weight
Mica powder: 20% by weight

Bonding Material

Normal boric acid: 16.30% by weight
Boric acid anhydride: 3.68% by weight
Zinc oxide: 15.02% by weight 3,300 g of this composite material was filled in a mold having a height of 100 mm, a width of 300 mm and a length of 300 mm, then inserted between heating plates (the heating plates temperature: 185°–195° C.) and hot-pressed under pressure of 60 kg/cm$^2$ for 30 minutes. (The mold temperature was from 170° to 180° C. ) Then, while maintaining the pressure, the heat source of the heating plates was cut off, and water was supplied to cooling pipes provided on the heating plates to lower the heating plates temperature. When the mold temperature became lower than 100° C., the pressure was released to obtain a composite having a thickness of about 15 mm, a width of 300 mm and a length of 300 mm.

Then, this composite was placed in an electric furnace and gradually heated from the normal temperature to 500° C. at a rate of from 5 to 10° C./hr to carry out heat treatment.

Then, the composite was slowly cooled to obtain a heat resistant soft composite of the present invention. The heat resistant soft composite thereby obtained was composed of 48.44% by weight of the talc component, 21.53% by weight of the mica component, 13.86% by weight of the B$_2$O$_3$ component and 16.17% by weight of ZnO component.

The physical properties and the application properties of the product are shown in Table 1. Among the physical properties, the hardness was measured by a Mohs' hardness meter. The bending strength was measured in accordance with Paragraph 6.3 of JIS C-2210 at the normal temperature, after heating at 600° C. for 3 hours and after heating 700° C. for 3 hours, respectively. The insulating resistance was measured in accordance with Paragraph 5.12.3 of JIS K-6911 at the normal temperature and after maintaining the product at 25° C. at relative humidity of 90% for 100 hours, respectively.

The arc-resistance was measured in accordance with Paragraph 5.15 of JIS K-6911 at the normal temperature.

With respect to the application properties, the heat resistant soft composite of the present invention was formed into rods having a diameter of from 11 to 12 mm and a length of from 150 to 200 mm, the rods were attached as supporting members of a heat treatment jig for an glass article (i.e. a cathode ray tube), and a cycle of operation of raising the temperature from the normal temperature to 500° C. at a rate of from 10 to 20° C., followed by gradual cooling (the time required for one cycle was from 3 to 4 hours) was continuously repeated on the assumption of 1 year operation, whereby scars and cracks appeared on the glass article were examined and at the same time the wearing of the composite as the supporting members was examined, and the useful period was determined.

EXAMPLE 2

A heat resistant soft composite of the present invention was prepared in the same manner as in Example 1 except that the composition of the materials was as shown below.

Major Components

Talc powder: 25% by weight
Mica powder: 40% by weight

Bonding Material

Normal boric acid: 16.30% by weight
Boric acid anhydride: 3.68% by weight
Zinc oxide: 15.02% by weight The heat resistant soft composite thereby obtained was composed of 26.91% by weight of the talc component, 43.06% by weight of the mica component, 13.86% by weight of the B$_2$O$_3$ component and 16.17% by weight of the ZnO component.

The physical properties and the application properties of the product are shown in Table 1. The test methods were the same as in Example 1.

EXAMPLE 3

A heat resistant soft composite of the present invention was prepared in the same manner as in Example 1 except that the composition of the materials was as shown below.

Major Components

Talc powder: 45% by weight
Mica powder: 15% by weight

Bonding Material

Normal boric acid: 18.63% by weight
Boric acid anhydride: 4.20% by weight
Zinc oxide: 17.17% by weight The heat resistant soft composite thus obtained was composed of 48.97% by weight of the talc component, 16.32% by weight of the mica component, 16.02% by weight of the B$_2$O$_3$ component and 18.69% by weight of the ZnO component.

The physical properties and the application properties of the product are shown in Table 1. The test methods were the same as in Example 1.

EXAMPLE 4

A heat resistant soft composite of the present invention was prepared in the same manner as in Example 1 except that the composition of the materials was as shown Major Components Talc powder: 30% by weight
Mica powder: 30% by weight Bonding Material Normal boric acid: 18.63% by weight
Boric acid anhydride: 4.20% by weight
Zinc oxide: 17.17% by weight The heat resistant soft composite thus obtained was composed of 32.65% by weight of the talc component, 32.65% by weight of the mica component, 16.02% by weight of the $B_2O_3$ component and 18.69% by weight of the ZnO component.

The physical properties and the application properties of the product are shown in Table 1. The test methods were the same as in Example 1.

COMPARATIVE EXAMPLE 1

A composite was prepared in the same manner as in Example 1 except that the composite material was prepared from the talc powder as the sole major component and the bonding material.

Major Component

Talc powder: 65% by weight

Bonding Material

Normal boric acid: 16.30% by weight
Boric acid anhydride: 3.68% by weight
Zinc oxide: 15.02% by weight The composite thus obtained was composed of 69.97% by weight of the talc component, 13.86% by weight of the $B_2O_3$ component and 16.17% by weight of the ZnO component.

The physical properties and the application properties of the product are shown in Table 1. The test methods were the same as in Example 1.

COMPARATIVE EXAMPLE 2

A composite was prepared in the same manner as in Example 1 except that the composite material was prepared from the mica powder as the sole major component and the bonding material.

Major Component

Talc powder: 65% by weight

Bonding Material

Normal boric acid: 16.30% by weight
Boric acid anhydride: 3.68% by weight
Zinc oxide: 15.02% by weight The composite thus obtained was composed of 69.97% by weight of the mica component, 13.86% by weight of the $B_2O_3$ component and 16.17% by weight of the ZnO component.

The physical properties and the application properties were as shown in Table 1. The test methods were the same as in Example 1.

COMPARATIVE EXAMPLE 3

As a conventional product, asbestos calcium silicate was obtained, and the application properties thereof were determined and shown in Table 1.

COMPARATIVE EXAMPLE 4

As a conventional product, boron nitride was obtained, and the application properties thereof were determined and shown in Table 1.

TABLE 1

| Composition of materials and properties | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Composition of materials | Major components | Talc powder | 45 | 25 | 45 | 30 | 65 | — | | |
| | | Mica powder | 20 | 40 | 15 | 30 | — | 65 | | |
| | Bonding material | Normal boric acid | 16.30 | 16.30 | 18.63 | 18.53 | 16.30 | 16.30 | | |
| | | Boric acid anhydride | 3.68 | 3.68 | 4.20 | 4.20 | 3.68 | 3.68 | | |
| | | Zinc oxide | 15.02 | 15.02 | 17.17 | 17.17 | 15.02 | 15.02 | | |
| Composition of composites | Major components | Talc powder | 48.44 | 26.91 | 48.97 | 32.65 | 69.97 | — | | |
| | | Mica powder | 21.53 | 43.06 | 16.32 | 32.65 | — | 69.97 | | |
| | Bonding material | $B_2O_3$ component | 13.86 | 13.86 | 16.02 | 16.02 | 13.86 | 13.86 | | |
| | | ZnO component | 16.17 | 16.17 | 18.69 | 18.69 | 16.17 | 16.17 | | |
| | | Hardness (Mohs') | 2.0 | 2.5 | 2.0 | 2.5 | 1.5 | 3.5 | | |
| Physical properties | Bending strength (kg/cm²) | Normal temp. | 420 | 535 | 370 | 480 | 180 | 550 | | |
| | | Heating at 600° C. for 3 hrs. | 418 | 528 | 364 | 475 | 175 | 545 | | |
| | | Heating at 700° C. for 3 hrs. | 413 | 517 | 358 | 462 | 172 | 540 | | |
| | Insulating resistance (Ω) | Normal temp. | $5.0 \times 10^{10}$ | $4.3 \times 10^{10}$ | $5.4 \times 10^{10}$ | $3.5 \times 10^{10}$ | $7.5 \times 10^{10}$ | $5.5 \times 10^{9}$ | | |
| | | 25° C.-90% RH 100 Hr | $6.3 \times 10^{9}$ | $4.5 \times 10^{9}$ | $6.5 \times 10^{9}$ | $3.8 \times 10^{9}$ | $8.5 \times 10^{9}$ | $1.2 \times 10^{8}$ | | |
| | | Arc resistance (sec.) | >420 | 360 | >420 | 400 | >420 | 300 | | |
| Application properties | Presence or absence of scars or cracks in the glass article (cathode ray tube) | | No defect | No defect | No defect | No defect | No defect | Scars appeared | No defect | No defect |
| | Life of the composite (months) | | 12 | >12 | 12 | >12 | 3 | >12 | 3 | 12 |

As is evident from the results listed in Table 1, the heat resistant soft composites obtained by the present invention have Mohs' hardness of from 2.0 to 2.5 and bending strength of from 370 to 535 kg/cm² and undergo no substantial degradation in the strength even when heated upto 700° C. Thus, they have superior heat resistance. They are also superior in the insulating resistance and arc resistance.

When they are used as supporting members of the heat treatment jig for the heat treatment of e.g. glass articles, they do not impart defects such as scars or cracks to the glass articles, and their wear-resistance is also superior to that of the conventional products. In the Examples, muscovite powder was used as a typical representative of the mica powder. However, similarly good results are obtainable when phlogopite powder is used instead.

Comparative Example 1 presents a problem in the wear-resistance, and Comparative Example 2 presents a defect that scars are formed on the glass article. These results indicate that the preferred ranges of the materials as specified in the foregoing are suitable.

In Comparative Example 3, asbestos calcium silicate was used. In this case, the life time of the composite obtained is very short. When such composite is employed, the replacement operation will be required so frequently that the total production costs will be expensive although the material itself is inexpensive. Further, the most serious disadvantage of this material is that it contains a substantial amount of asbestos, and accordingly a due care will be required for the replacement operation. Further, the powder dusts deteriorate the working environment and thus are likely to create a problem in respect of the labour hygiene. The heat resistant soft composites of the present invention do not contain poisonous substances such as asbestos and they are safe in the handling.

The boron nitride as a kind of new ceramics is widely used as supporting members of heat treatment jigs and it is superior in the wear-resistance. However, when deposited on the glass article, for instance when deposited on a cathode ray tube, it tends to lead to defective insulation of the product itself. Accordingly, its use is limited. Further, it has a disadvantage that it is a very expensive material.

The heat resistant soft composites according to the present invention are advantageous in that not only the materials are inexpensive but also the products are superior in their processability. Thus, the present invention provides new materials which are free from the drawbacks inherent to the conventional products.

The heat resistant soft composites according to the present invention are superior also in the electric insulating property and arc-resistance to the conventional products including Comparative Examples 1 and 2, and accordingly they are applicable also as insulating spacers, washers or arc-extingushing materials for electric furnaces or vehicles where non-flammability is required. Thus, they are practically extremely useful.

We claim:

1. A process for preparing a heat resistant soft composite which comprises hot-pressing a mixture comprising talc powder and mica powder as major components and a bonding material composed of normal boric acid, boric acid anhydride and zinc oxide, at a temperature of from 160 to 200° C. under pressure of from 50 to 100 kg/cm$^2$ to form a composite, and subjecting the composite to heat treatment at a temperature of from 450 to 500° C.

2. The process according to claim 1 wherein said mixture has the following composition:
   major components:
   25-45% by weight of talc powder
   15-40% by weight of mica powder
   bonding material:
   16.30-18.63% by weight of normal boric acid
   3.68-4.20% by weight of boric acid anhydride
   15.62-17.17% by weight of zinc oxide 3. A heat resistant soft composite comprising 26.9-49.0% by weight of a talc component, 16.3-43.1% by weight of a mica component, 13.9-16.0% by weight of a $B_2O_3$ component, and 16.2-18.7% by weight of a ZnO component, prepared by the process according to claim 1.

* * * * *